US009772650B2

United States Patent
Nguyen et al.

(10) Patent No.: US 9,772,650 B2
(45) Date of Patent: Sep. 26, 2017

(54) SOLVING UNSTABLE UNIVERSAL ASYNCHRONOUS RECEIVE TRANSMIT (UART) COMMUNICATION BETWEEN A POWER MANAGER AND A UNIVERSAL SERIAL BUS (USB)-BRIDGE DEVICE

(71) Applicant: Western Digital Technologies, Inc., Irvine, CA (US)

(72) Inventors: Mark Nguyen, Fountain Valley, CA (US); Charles A. Neumann, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/983,221

(22) Filed: Dec. 29, 2015

(65) Prior Publication Data

US 2017/0185100 A1    Jun. 29, 2017

(51) Int. Cl.
| | |
|---|---|
| *G06F 1/10* | (2006.01) |
| *G06F 13/16* | (2006.01) |
| *G06F 13/38* | (2006.01) |
| *G06F 13/40* | (2006.01) |
| *G06F 1/32* | (2006.01) |

(52) U.S. Cl.
CPC .............. *G06F 1/10* (2013.01); *G06F 1/3206* (2013.01); *G06F 13/16* (2013.01); *G06F 13/382* (2013.01); *G06F 13/4027* (2013.01)

(58) Field of Classification Search
CPC .......... G06F 1/10; G06F 13/16; G06F 13/382; G06F 13/4027; G06F 13/4068
See application file for complete search history.

(56) References Cited

U.S. PATENT DOCUMENTS 5,434,996 A * 7/1995 Bell ........................ H04N 7/152
348/E7.084
5,991,844 A * 11/1999 Khosrowpour ..... G06F 11/2005
370/285

(Continued)

FOREIGN PATENT DOCUMENTS

EP    1134667 A3    3/2004

OTHER PUBLICATIONS

Korean Intellectual Property Office, PCT International Search Report and the Written Opinion of the International Searching Authority for International Application No. PCT/US2016/068703, Apr. 21, 2017, 10 pages.

*Primary Examiner* — Stefan Stoynov

(57) ABSTRACT

A device may comprise data storage, a power manager and a bridge device that is coupled to the data storage and to the power manager, and configured to bridge between at least a first data protocol and at least a second data protocol. The bridge device may comprise a UART, a first clock, a second clock and bridge device firmware configured to cause the bridge device to selectively configure the UART for communication using the first clock or the second clock. The power manager may be configured to, when a command is to be issued to the data storage when the bridge device firmware has configured the UART for communication using the first clock, assert a signal that causes the bridge device firmware to stop configuring the UART for communication using the first clock and to configure the UART for communication using the second clock.

23 Claims, 2 Drawing Sheets

(56) References Cited

U.S. PATENT DOCUMENTS

| | | | |
|---|---|---|---|
| 6,499,054 B1 | 12/2002 | Hesselink et al. | |
| 6,732,158 B1 | 5/2004 | Hesselink et al. | |
| 6,754,839 B1 | 6/2004 | Wegner | |
| 7,093,153 B1 * | 8/2006 | Witek | G06F 1/08 327/100 |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,555,585 B2 | 6/2009 | Gupta et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 9,342,054 B2 * | 5/2016 | White | G04G 3/04 |
| 2003/0093702 A1 | 5/2003 | Luo et al. | |
| 2005/0144195 A1 | 6/2005 | Hesselink et al. | |
| 2005/0144200 A1 | 6/2005 | Hesselink et al. | |
| 2007/0063776 A1 | 3/2007 | Okuda | |
| 2008/0077818 A1 | 3/2008 | Rauschmayer et al. | |
| 2008/0104434 A1 | 5/2008 | May | |
| 2012/0036041 A1 | 2/2012 | Hesselink | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |
| 2014/0281635 A1 | 9/2014 | Reddy | |

* cited by examiner

SOLVING UNSTABLE UNIVERSAL ASYNCHRONOUS RECEIVE TRANSMIT (UART) COMMUNICATION BETWEEN A POWER MANAGER AND A UNIVERSAL SERIAL BUS (USB)-BRIDGE DEVICE

BACKGROUND

Embodiments are related to devices and methods for solving unstable Universal Asynchronous Receive Transmit (UART) communications between a power manager device a Universal Serial Bus (USB) bridge device.

DETAILED DESCRIPTION

Figure 1:
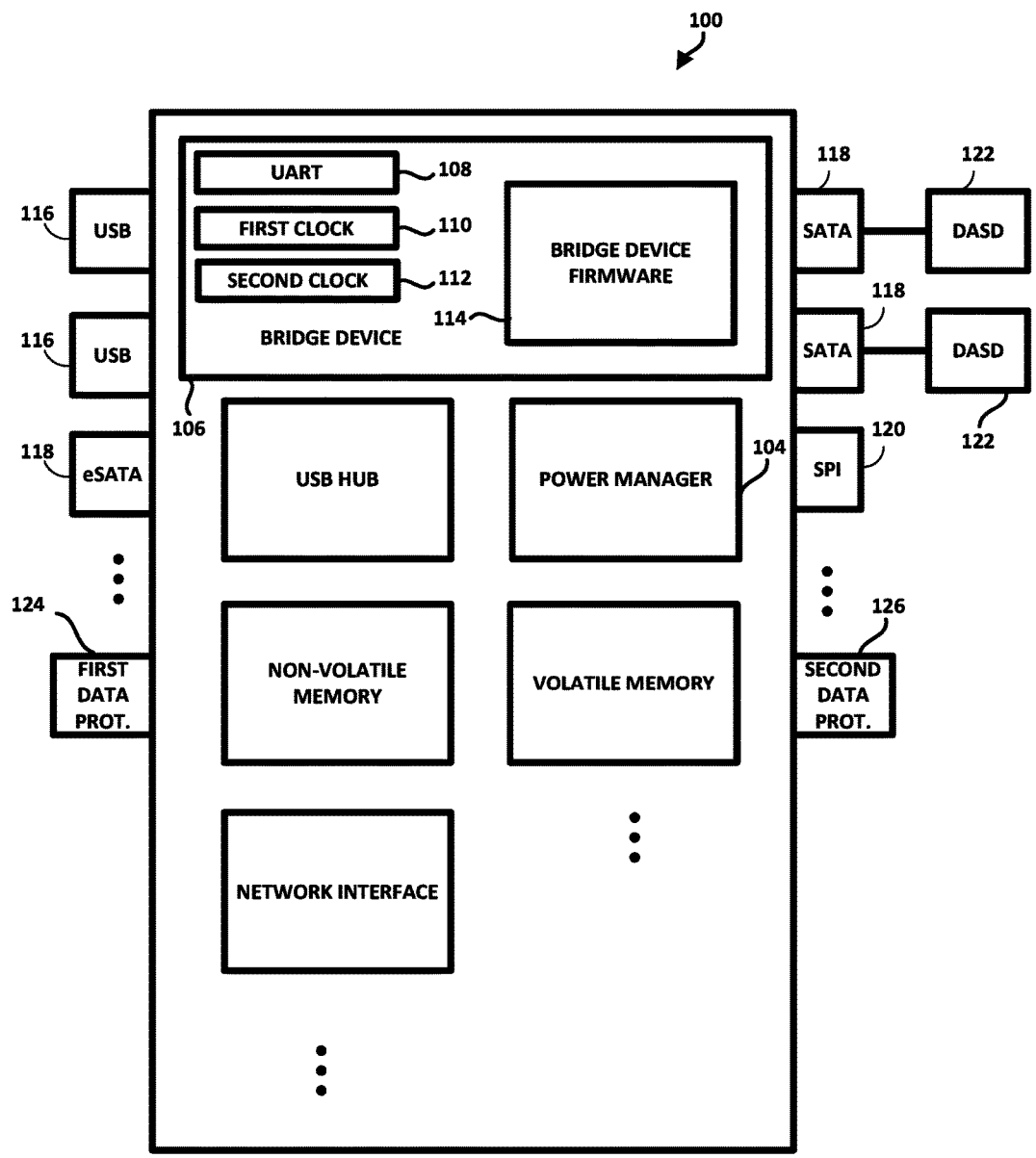
FIG. 1 is a block diagram of a device according to one embodiment.

FIG. 1 is a block diagram of a device 100 according to one embodiment. As shown, device 100 may comprise a power manager device 104 and a bridge device 106. The bridge device 106 may be coupled to the data storage device and to the power manager device 104. The bridge device 106 may be configured to bridge between one or more first data protocols 124 and one or more second data protocols 126. For example, the first data protocol may include USB as shown at 116 or eSATA (external Serial AT Attachment) as shown at 118. The second data protocol 126 may include, for example, SATA as shown at 120 or SPI (Serial peripheral Interface) as shown at 122, to identify but a few possible data protocols. As also shown in FIG. 1, the bridge device 106 may comprise a UART 108, a first clock 110, a second clock 112 and bridge device firmware 114.

In one embodiment, the first clock 110 may be or may comprise a ring oscillator, which is a device composed of an odd number of logical NOT gates whose output oscillates between two voltage levels, representing true and false. The NOT gates, or inverters, are attached in a chain and the output of the last inverter is fed back into the first. In one embodiment, the second clock 112 may be or comprise a phase-locked loop (PLL) oscillator. A PLL is a control system that generates an output signal whose phase is related to the phase of an input signal. A PLL comprises a variable frequency oscillator and a phase detector. The oscillator generates a periodic signal. The phase detector compares the phase of that signal with the phase of the input periodic signal and adjusts the oscillator to keep the phases matched. The output signal is brought back toward the input signal for comparison in a feedback loop and the phase difference between the input and the output is used to adjust the frequency of the variable frequency oscillator.

In one implementation, the bridge device 106 may comprise a JMS562 USB3.0 & eSATA GEN III to Dual SATA GEN III Ports Bridge chip, manufactured by JMicron Technology Corp. The device 100 may, according to one embodiment, facilitate communications between, for example, a computing device coupled to one of the USB ports 116 or eSATA ports 118 and direct access storage devices (DASDs) 122 coupled to SATA or SPI ports 118, 120.

To save power, bridge device 106 may transition to a low power mode when the device is in suspended or sleep mode or when, for example, no interface cables are plugged in to the communication ports 116, 118, 118 and/or 120. In that case, the UART 108 may be configured to run on the first clock 110, which may include the aforementioned ring oscillator. However, the ring oscillator may have an unacceptably high UART error data rate. When the UART 108 is clocked by the first clock, therefore, it may fail to communicate with the power manager in the low power mode. Therefore, the device 100 may fail to operate (e.g., boot up) reliably. The same device 100, however, may well operate with wholly acceptable error data rates when the UART 108 is clocked by a more precise clock such as second clock 112 configured as a PLL oscillator. Bridge device firmware 114 may be stored in non-volatile or non-transient memory in the form of instructions that, when executed, cause the device 100 to cause the bridge device 106 to selectively configure the UART 108 for communication using either the first clock 110 or the second clock 112.

According to one embodiment, the power manager device 104 may be configured such that, when a command is to be issued to the data storage device 102 when the bridge device firmware 114 has configured the UART 108 for communication using the first clock 110, a signal is asserted that causes the bridge device firmware 114 of the bridge device 106 to stop configuring the UART 108 for communication using the first clock 110 and to configure the UART 108 for communication using the second clock 112. In this manner, the power manager 104 may cause the bridge device to switch its UART from being clocked by a less precise first clock (e.g., a ring oscillator) to being clocked by a comparatively more precise second clock (e.g., a PLL oscillator), to ensure a substantially decreased error data rate. This substantially decreased error data rate may be ensured even when the device 100 is in a low power mode in which the UART is configured to use less power-consuming but also less precise UART clocks.

The bridge device 106 may comprise a plurality of General Purpose Input Output (GPIO) ports. According to one embodiment, the signal asserted by the power manager 104 and received by the bride device and acted upon by the bridge firmware 114 may be asserted on a selected one of the GPIO ports of the bridge device 106. In the exemplary implementation in which the bridge device comprises a JMS562 Application Specific Integrated circuit (ASIC), the power manger 104 may be configured to use the LINK_STATUS_562 GPIO line to signal the JMS562 to exit suspend or sleep mode when the power manager has a command to send to the JMS562. Upon sensing the assertion of the LINK_STATUS_562 GPIO line, the JMS562 may, according to one embodiment, stop configuring the UART 108 from being clocked by the first clock 110 and will configure the UART 108 for communication using the second clock 112, in effect, switching the UART 108 from being clocked by its internal ring oscillator to being clocked by a PLL oscillator, which is a mode of operation that provides a reliable clock for the UART communication with the power manager 104.

When the bridge device 106 is in suspend or sleep mode, it may configure the UART 108 to use the first clock 110. To cause to the bridge device to, in effect, wake up from its suspend of sleep mode and cause the UART to use the second clock 112 for communication with the power manager 104, the power manager 104 may be configured to set a selected GPIO line of the bridge device (e.g., the LINK_STATUS_562) to a logical high to signal the bridge device 106 to JMS562 to exit the suspend or sleep mode. Firmware of the power manager 104 may be configured to assert the bridge device's GPIO line upon detection of a predetermined event. According to one embodiment, such predetermined event may comprise, for example, a button press, USB cable plug or unplug event, a Thunderbolt cable plug or unplug event, DASDs turned OFF, among other possibilities. In one implementation, once the bridge device 106 has exited suspend or sleep mode and has successfully switched from using the first clock 110 to using the second clock 112 for UART clocking, the power manager 104 may send, and the bridge device 106 may receive, a first command (the "N" command, for example) and the bridge device 106 may receive all the events one at a time and perform the actions associated therewith. When there are no more events, the power manager 105 may send, and the bridge device 106 may receive, a second command (the "EON" (End of Notification) command, for example), whereupon the power manager 104 may reset the previously set GPIO line (e.g., the LINK_STATUS_562) of the bridge device to a logical low. In this state, the bridge device may continue to clock its UART using the second clock 112 for a period of time or may stop using the second clock 112 and resume clocking its UART 108 with the first clock 110 and resume its suspend or sleep mode, to conserve power or for any other purpose.

Significantly, causing the bridge device 106 to switch its UART clocking from the first clock 110 to its second clock 112 enables the power manager to reliably communicate with the bridge device 106 when the bridge device is in suspend or sleep mode, without requiring the power manager 104 to initiate iterative and time consuming training sequences in which an acceptable BAUD rate is negotiated at which the bridge device and power manager may communicate without unacceptable data error rates.

Figure 2:
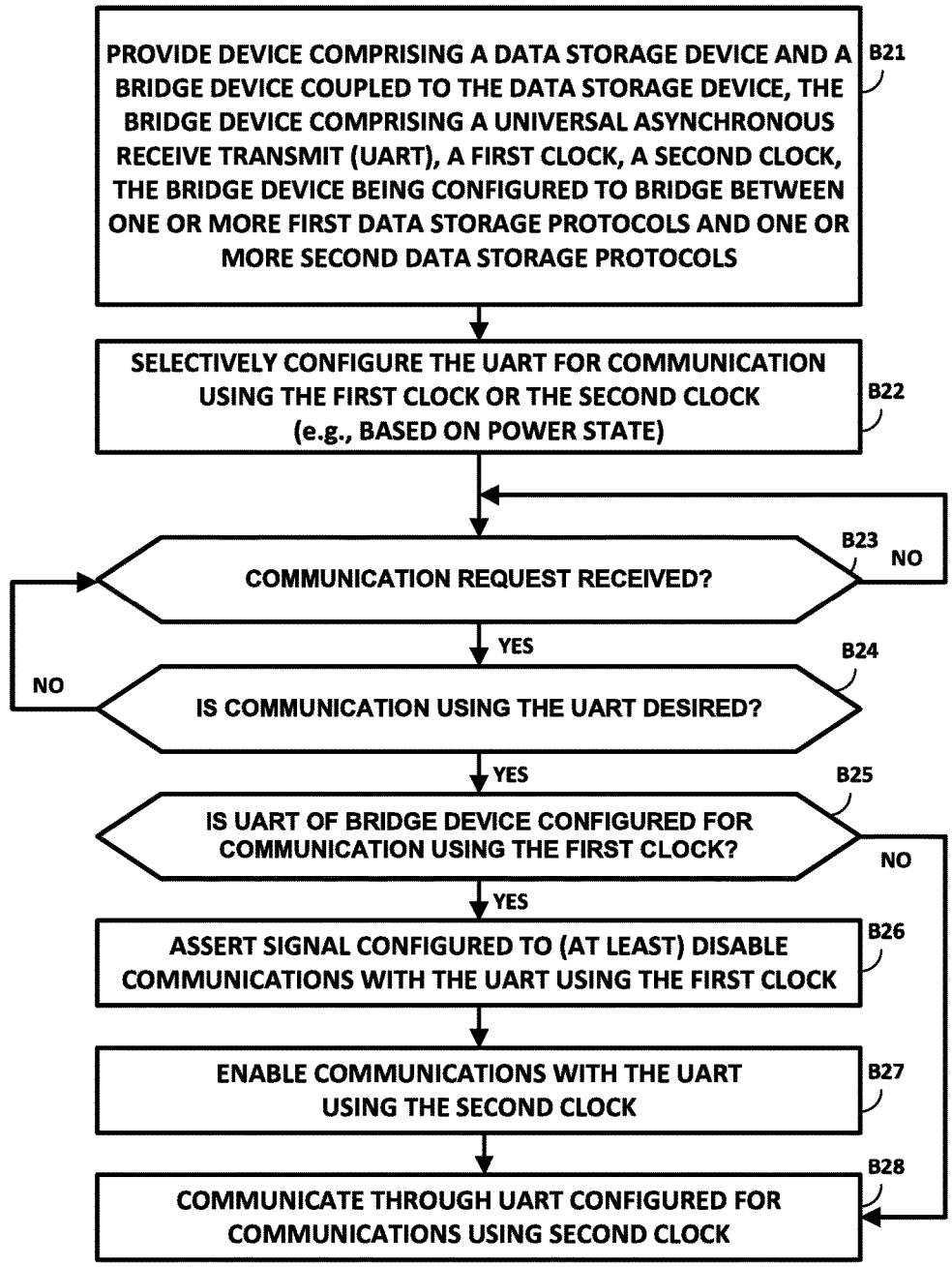
FIG. 2 is a flowchart of a method according to one embodiment.

FIG. 2 is a flowchart of a method according to one embodiment. As shown therein, block B21 calls for providing a device comprising a data storage device and a bridge device coupled to the data storage device. As shown in B21, the bridge device may comprise a UART, a first clock, a second clock, and the bridge device may be configured to bridge between at least a first data protocol and at least a second data protocol. The UART may then be selectively configured, as shown at B22, for communication using the first clock or the second clock. For example, in a low power state such as a suspend or sleep mode, the UART may be configured for communication using the first clock. In a higher-power state or normal power mode (i.e., non-suspend or sleep mode), the UART may be configured for communication using the second clock.

At B23, it may be determined whether a communication request (e.g., from the power manager 104) has been received. This may be determined, according to one embodiment, by monitoring the high/low status of a selected GPIO line on the bridge device 106. For example, as long as no communication request is detected (NO branch of B23), no further action need be taken. In this state, the bridge controller may continue to clock the UART 108 using the first clock 110 as it would otherwise do when in suspend or sleep mode. Alternatively, the bridge device 108 may continue to clock its UART 108 using the second clock 112 if it was previously in a normal mode (i.e., non-suspend or sleep mode) or may continue to clock its UART 108 using the second clock 112 for a period of time and switch back to clocking the UART 108 using the first clock 110 after some period of time, to conserve power.

If the power manager 104 requests communications with the bridge device 108 (YES branch of B23), it may be determined whether communication with the UART is desired, as shown at B24. If no (NO branch of B24), the method may revert back to B23. If communication with the UART is indeed desired (YES branch of B24), it may then be determined whether the UART 108 of the bridge device 106 is currently configured for communication using the first clock, as called for by B25. If not (NO branch of B25), communication through the UART may be configured using the second clock 112, as shown at B28. If, however, the UART 108 of the bridge device 106 is, in fact, configured for communication using the first clock 110 (YES branch of B25), then a signal may be asserted to (among other possible uses), disable communication with the UART using the first clock 110, as shown at B26. Communication with the UART 108 of the bridge device 106 may then be enabled using the second clock 112, as shown at B27. After having been so enabled, communications may proceed through the UART 108 that has been configured for communication using the second clock 112 (that includes a PLL oscillator, for example), as shown at B28.

According to one embodiment, the bridge device 106 referred to in FIG. 2 may further comprise a plurality of GPIO ports and block B26 may be carried out by asserting the signal on a selected one of these GPIO ports. In one embodiment, the first clock of FIG. 2 may be or comprise a ring oscillator and the second clock of FIG. 2 may be or comprise a PLL oscillator. Recall that B22 calls for the UART 108 to be selectively configured for communication using the first clock or the second clock. In one embodiment, this selective configuration may comprise configuring the UART 108 for communication using the first clock 110 when the bridge device 106 is in a first mode such as, for example, a low power mode. This selective configuring may also configure the UART 108 for communication using the second clock 112 when the bridge device 106 is in a second mode such as, for example, a normal operation power mode.

In B26, a signal may be asserted, which signal may be configured to disable communications with the UART 108 using the first clock. In one embodiment, asserting this signal may be carried out upon occurrence of a selected event. Although by no means a complete list, exemplary ones of such a selected event may include, for example, an issued command, a data storage device-related event, a cable plug or unplug-related event and/or a button press-related event. Indeed, the firmware of the power manager 104 may be configured to assert the bridge device's GPIO line upon detection of any one of these events or upon detection of another selected event.

In B27 or B28, after the UART 108 has been configured for communication using the second clock 112, a notification signal, one or more commands, and/or an end of notification signal may be sent. Thereafter, when there are no more events, the power manager 105 may send, and the bridge device 106 may receive, another end of notification command. The power manager 104 may then reset the previously set GPIO line (e.g., the LINK_STATUS_562) of the bridge device to a logical low. In this state, the bridge device may continue to clock its UART using the second clock 112 for a period of time or may stop using the second clock 112 and resume clocking its UART 108 with the first clock 110 and resume its suspend or sleep mode, to conserve power or for any other purpose.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A device, comprising:
a data storage device;
a power manager device; and
a bridge device coupled to the data storage device and to the power manager device, configured to bridge between at least a first data protocol and at least a second data protocol, the bridge device comprising:
a Universal Asynchronous Receive Transmit (UART);
a first clock;
a second clock; and
bridge device firmware configured to cause the bridge device to selectively configure the UART for communication using one of the first clock and the second clock,
wherein the power manager device is configured, when a command is to be issued to the data storage device when the bridge device firmware has configured the UART for communication using the first clock, to assert a signal that causes the bridge device firmware to stop configuring the UART for communication using the first clock and to configure the UART for communication using the second clock.

2. The device of claim 1, wherein the bridge device further comprises a plurality of General Purpose Input Output (GPIO) ports and wherein the power manager device is configured to assert the signal on a selected one of the plurality of GPIO ports.

3. The device of claim 1, wherein the first clock comprises a ring oscillator.

4. The device of claim 1, wherein the second clock comprises a Phase Locked Loop (PLL) oscillator.

5. The device of claim 1, wherein the bridge device is configured to configure the UART for communication using the first clock responsive to the bridge device being in a first mode.

6. The device of claim 5, wherein the first mode includes a low power mode.

7. The device of claim 1, wherein the bridge device is configured to configure the UART for communication using the second clock responsive to the bridge device being in a second mode.

8. The device of claim 7, wherein the second mode includes a normal operation power mode.

9. The device of claim 1, wherein the power manager device is further configured to assert the signal upon occurrence of a selected event.

10. The device of claim 9, wherein the selected event comprises at least one of an issued command, a data storage device-related event, a cable plug or unplug-related event and a button press-related event.

11. The device of claim 1, wherein the power manager device is further configured to send to the bridge device, after the UART has been configured for communication using the second clock, at least one of a notification signal, one or more commands, and an end of notification signal.

12. A method, comprising:
providing a device comprising a data storage device and a bridge device coupled to the data storage device, the bridge device comprising:
a Universal Asynchronous Receive Transmit (UART);
a first clock; and
a second clock, the bridge device being configured to bridge between at least a first data protocol and at least a second data protocol;
selectively configuring the UART for communication using one of the first clock and the second clock; and
responsive to the determining that the UART is configured for communication using the first clock and the determining that a command is to be issued to the data storage device, asserting a signal configured to disable communications with the UART using the first clock and to enable communications with the UART using the second clock.

13. The method of claim 12, wherein the bridge device further comprises a plurality of General Purpose Input Output (GPIO) ports and wherein asserting the signal comprises asserting a signal on a selected one of the plurality of GPIO ports.

14. The method of claim 12, wherein providing is performed with the first clock comprising a ring oscillator.

15. The method of claim 12, wherein providing is performed with the second clock comprising a Phase Locked Loop (PLL) oscillator.

16. The method of claim 12, wherein selectively configuring comprises configuring the UART for communication using the first clock responsive to the bridge device being in a first mode.

17. The method of claim 16, wherein the first mode includes a low power mode.

18. The method of claim 12, wherein selectively configuring comprises configuring the UART for communication using the second clock responsive to the bridge device being in a second mode.

19. The method of claim 18, wherein the second mode includes a normal operation power mode.

20. The method of claim 12, wherein asserting the signal is further performed upon occurrence of a selected event.

21. The method of claim 20, wherein the selected event comprises at least one of an issued command, a data storage device-related event, a cable plug or unplug-related event and a button press-related event.

22. The method of claim 12, further comprising sending to the bridge device, after the UART has been configured for communication using the second clock, at least one of a notification signal, one or more commands, and an end of notification signal.

23. A circuit board, comprising:
a power manager device; and
a bridge device configured to couple to the power manager device, the bridge device being configured to couple to a data storage device and to bridge between at least a first data protocol and at least a second data protocol, the bridge device comprising:

a Universal Asynchronous Receive Transmit (UART);
a first clock;
a second clock; and
bridge device firmware configured to cause the bridge device to selectively configure the UART for communication using one of the first clock and the second clock, wherein the power manager device is configured to, when a command is to be issued to the data storage device when the bridge device firmware has configured the UART for communication using the first clock, assert a signal that causes the bridge device firmware to stop configuring the UART for communication using the first clock and to instead configure the UART for communication using the second clock.

* * * * *

UNITED STATES PATENT AND TRADEMARK OFFICE
CERTIFICATE OF CORRECTION

PATENT NO.       : 9,772,650 B2
APPLICATION NO.  : 14/983221
DATED            : September 26, 2017
INVENTOR(S)      : Nguyen et al.

It is certified that error appears in the above-identified patent and that said Letters Patent is hereby corrected as shown below:

In the Claims

Claim 1, at Column 5, Lines 36-38, replace:
"wherein the power manager device is configured, when a command is to be issued to the data storage device when the bridge device firmware has configured the UART for communication using the first clock"
With:
"wherein the power manager device is configured, responsive to determining a command is to be issued to the data storage device and the bridge device firmware has configured the UART for communication using the first clock".

Claim 12, at Column 6, Lines 16-27, replace:
"a second clock, the bridge device being configured to bridge between at least a first data protocol and at least a second data protocol;
selectively configuring the UART for communication using one of the first clock and the second clock; and
when a command is to be issued to the data storage device and the UART is configured for communication using the first clock, asserting a signal configured to disable communications with the UART using the first clock and to enable communications with the UART using the second clock"
With:
"a second clock:
wherein the bridge device is configured to bridge between at least a first data protocol and at least a second data protocol;
determining that the UART is configured for communication using the first clock;
determining that a command is to be issued to the data storage device; and
responsive to determining, asserting a signal configured to disable communications the UART using the first clock and to enable communications with the UART using the second clock".

Signed and Sealed this
Nineteenth Day of June, 2018

Andrei Iancu
*Director of the United States Patent and Trademark Office*

CERTIFICATE OF CORRECTION (continued)
U.S. Pat. No. 9,772,650 B2

Claim 16, at Column 6, Lines 38-39, replace:
"The method of claim 12, wherein selectively configuring comprises configuring"
With:
"The method of claim 12, further comprising configuring".

Claim 18, at Column 6, Lines 44-45, replace:
"The method of claim 12, wherein selectively configuring comprises configuring"
With:
"The method of claim 12, further comprising configuring".

Claim 23, at Column 7, Lines 8-11, replace:
"wherein the power manager device is configured to, when a command is to be issued to the data storage device when the bridge device firmware has configured the UART for communication using the first clock"
With:
"wherein the power manager device is configured, responsive to determining a command is to be issued to the data storage device and the bridge device firmware has configured the UART for communication using the first clock".